(12) United States Patent
Mackey et al.

(10) Patent No.: US 8,243,044 B2
(45) Date of Patent: *Aug. 14, 2012

(54) METHODS AND SYSTEMS FOR CHANGING THE APPEARANCE OF A POSITION SENSOR WITH A LIGHT EFFECT

(75) Inventors: Bob Lee Mackey, San Jose, CA (US); Shawn P. Day, San Jose, CA (US); Alfred Woo, Milpitas, CA (US); Mark Jennings, San Jose, CA (US)

(73) Assignee: Synaptics Incorporated, Santa Clara, CA (US)

( * ) Notice: Subject to any disclaimer, the term of this patent is extended or adjusted under 35 U.S.C. 154(b) by 1161 days.

This patent is subject to a terminal disclaimer.

(21) Appl. No.: 12/100,978

(22) Filed: Apr. 10, 2008

(65) Prior Publication Data

US 2008/0192026 A1 Aug. 14, 2008

Related U.S. Application Data

(63) Continuation of application No. 10/417,786, filed on Apr. 15, 2003, now Pat. No. 7,382,360.

(51) Int. Cl.
*G06F 3/045* (2006.01)
*G06F 3/041* (2006.01)
*G06F 3/042* (2006.01)
*G02F 1/1335* (2006.01)
*G02F 1/13* (2006.01)

(52) U.S. Cl. .......... 345/174; 345/173; 345/176; 349/62; 349/63; 349/201

(58) Field of Classification Search .......... 345/173–178; 349/62, 63, 201
See application file for complete search history.

(56) References Cited

U.S. PATENT DOCUMENTS

| | | | |
|---|---|---|---|
| 4,521,870 A | 6/1985 | Babbel et al. | |
| 5,225,823 A * | 7/1993 | Kanaly | 345/89 |
| 5,608,550 A * | 3/1997 | Epstein et al. | 349/57 |
| 5,666,113 A | 9/1997 | Logan | |

(Continued)

OTHER PUBLICATIONS

Agilent Technologies, Agilent HSMA/C/L-C120, HSMD/G/S/H-C120, HSMM/N/Q/R-C120 Right Angle ChipLED Data Sheet, 9 pages, Apr. 6, 2002.

(Continued)

*Primary Examiner* — Bipin Shalwala
*Assistant Examiner* — Ilana Spar
(74) *Attorney, Agent, or Firm* — Ingrassia Fisher & Lorenz, P.C.

(57) ABSTRACT

Systems and methods for detecting a position of an object in a sensing region are disclosed. One system includes a position sensor having an opaque capacitive proximity sensor, a light source, and a light conductor coupled to the light source and at least partially disposed over the opaque sensor, the light conductor configured to transmit at least a portion of the light from the light source to generate driven light effects in the sensing region. The system further includes a processor configured to control production of the light, and a display configured to illustrate a digital representation based on the position. A method includes the steps of sensing a position of an object in the sensing region based on a conductive property of the object, controlling light produced by a light source, and generating driven light effects in the sensing region using at least a portion of the light.

20 Claims, 9 Drawing Sheets

U.S. PATENT DOCUMENTS

| | | | |
|---|---|---|---|
| 5,670,755 | A | 9/1997 | Kwon |
| 5,736,686 | A | 4/1998 | Perret, Jr. et al. |
| 5,742,373 | A | 4/1998 | Alvelda |
| 6,462,941 | B1 | 10/2002 | Hulick et al. |
| 6,560,612 | B1 | 5/2003 | Yamada et al. |
| 6,614,422 | B1 | 9/2003 | Rafii et al. |
| 6,680,731 | B2 | 1/2004 | Gerpheide et al. |
| 6,738,051 | B2 | 5/2004 | Boyd et al. |
| 6,757,002 | B1 | 6/2004 | Oross et al. |
| 6,803,905 | B1 | 10/2004 | Capps et al. |
| 6,822,640 | B2 * | 11/2004 | Derocher ............ 345/173 |
| 6,842,170 | B1 * | 1/2005 | Akins et al. ............ 345/173 |
| 7,123,243 | B2 * | 10/2006 | Kawasaki et al. ............ 345/173 |
| 7,382,360 | B2 * | 6/2008 | Mackey et al. ............ 345/173 |
| 2002/0084992 | A1 | 7/2002 | Agnew |
| 2002/0190975 | A1 | 12/2002 | Kerr |
| 2003/0002246 | A1 | 1/2003 | Kerr |
| 2003/0122794 | A1 * | 7/2003 | Caldwell ............ 345/173 |
| 2004/0189612 | A1 | 9/2004 | Bottari et al. |

OTHER PUBLICATIONS

Agilent Technologies, Light Guide Techniques Using LED Lamps, Application Brief I-003, 23 pages, Mar. 25, 2002.

NASA Goddard Space Flight Center, "More About the Relationship Between Intensity and Distance," http://imagine.gsfx.nasa.gov/YBA/M31-velocity/1overR2-more.html, 2 pages, accessed May 19, 2005.

Blue/White UV Ink, "UV Invisible Inks, Ink Pads and Pens," Feb. 2, 2002, http://maxmax.com/aUVBlueInvisibleInks.htm, 7 pages.

* cited by examiner

METHODS AND SYSTEMS FOR CHANGING THE APPEARANCE OF A POSITION SENSOR WITH A LIGHT EFFECT

REFERENCE TO RELATED APPLICATION

This application is a continuation of U.S. patent application Ser. No. 10/417,786, filed on Apr. 15, 2003.

TECHNICAL FIELD OF THE INVENTION

The present invention generally relates to position sensors such as touchpads, and more particularly relates to devices, systems and methods for producing light effects that change the appearance of position sensors.

BACKGROUND OF THE INVENTION

Position sensors are used as input devices for computers, personal digital assistants (PDAs), media players, video game players, consumer electronics, cellular phones, payphones, point-of-sale terminals and the like. One common type of position sensor is the touchpad-type sensor, which can be readily found, for example, as an input device on many notebook-type computers. A user generally operates the touchpad by moving a finger, stylus or other pointer near a sensing surface to move a cursor or other indicator on a display screen. A capacitive or inductive proximity sensor and/or a resistive touch sensor within the device senses the position of the finger or pointer, and suitably relays an electrical and/or electronic indication of the position to the computer or other host. One example of a touchpad that is based on capacitive sensing technologies is described in U.S. Pat. No. 5,880,411, which issued to Gillespie et al. on Mar. 9, 1999. Position sensors have also been combined with liquid crystal display technologies to create touch sensitive displays for notebook-type computers, PDAs, point of sale terminals, automatic teller machines, kiosks and the like.

Although position sensors have been widely adopted, designers continue to look for ways to improve the sensors' appearance and functionality. In particular, difficulties have long been realized in illuminating or otherwise producing light effects on the sensor. Some touch-sensitive displays have been illuminated with backlighting from a fluorescent lamp or other source. This technique has several inherent disadvantages, however, most notably that the sensors used in such devices must typically be made transparent or translucent so that light is able to pass through the sensor to the observer's eye. Although such sensors may be fabricated from materials such as Indium Tin Oxide (ITO), these materials have generally been found to be disadvantageous in terms of cost, manufacturability, design flexibility, performance and the like. Moreover, ITO can be somewhat absorptive, thereby partially obscuring the display. Even further, ITO is frequently subject to wear and cracking in use, thereby limiting the lifetime of the sensor.

Accordingly, it is desirable to provide a position sensor that is capable of producing a light effect that modifies the appearance of the position sensor. In addition, it is desirable to produce the light effect without requiring a transparent or translucent touch sensor. Moreover, it is desirable to create a position sensor that provides position-sensitive soft control and/or status indicator regions without requiring a liquid crystal or other display. Other desirable features and characteristics of the present invention will become apparent from the subsequent detailed description and the appended claims, taken in conjunction with the accompanying drawings and the foregoing technical field and background.

BRIEF SUMMARY OF THE INVENTION

Various embodiments of the invention provide position sensors for detecting a position of an object in a sensing region. An exemplary position sensor comprises an opaque capacitive proximity sensor configured to sense the position of the object in the sensing region based on a conductive property of the object. The position sensor further comprises a light source for producing light, and a light conductor coupled to the light source and at least partially disposed over the opaque sensor, the light conductor configured to transmit the light to generate driven light effects in the sensing region.

Systems for responding to a position of an object in a sensing region are also provided. One exemplary system comprises position sensor comprising an opaque capacitive proximity sensor configured to sense the position of the object in the sensing region based on a conductive property of the object, a light source configured to produce light, and a light conductor coupled to the light source and at least partially disposed over the opaque sensor, the light conductor configured to transmit at least a portion of the light from the light source to generate driven light effects in the sensing region. The system also comprises a processor coupled to the light source and configured to control production of the light, and a display coupled to the position sensor and the processor, the display configured to illustrate a digital representation based on the position.

Various other embodiments provide methods for detecting a position of an object in a sensing region. An exemplary method comprises the step of sensing, via an opaque capacitive proximity sensor, the position of the object in the sensing region based on a conductive property of the object. The method further comprises the steps of controlling, via a control system, light produced by a light source, and generating, via a light conductor coupled to the light source, driven light effects in the sensing region using at least a portion of the light.

BRIEF DESCRIPTION OF THE DRAWINGS

Various aspects of the present invention will hereinafter be described in conjunction with the following drawing figures, wherein like numerals denote like elements.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

According to various exemplary embodiments, a position sensor is provided with a light source and a light conductor having a light pipe and/or one or more optical fibers. The light conductor suitably transmits light across the position sensor, and light is scattered from the conductor to produce a light effect that is observable by a user and that alters the appearance of the position sensor. Examples of light effects include illuminating the position sensor, flashing a light, changing a color of a light, and the like. Because light is distributed by a light conductor, the light source may be placed in any location, and the need for backlighting is suitably reduced. Moreover, because light can be effectively conducted between the position sensor and the viewer's eye, the position sensor is no longer required to facilitate light transmission. Accordingly, the position sensor does not need to be made from expensive transparent materials, thereby improving the cost and performance of the position sensor. In a further embodiment, light scattering from the conductor can be arranged such that one or more status indicators, "soft buttons" and/or other "soft controls" are created on the sensor without the need for backlighting or separate display functionality.

Although the various embodiments described herein frequently refer to "touchpads", the term "touchpad" as used herein is intended to encompass not only conventional touchpad devices, but also a broad range of equivalent devices that are capable of detecting the position of a finger, pointer, stylus or other object. Such devices may include, without limitation, touch screens, touch pads, touch tablets, biometric authentication devices, handwriting or character recognition devices, and the like. Similarly, the terms "position" or "object position" as used herein are intended to broadly encompass absolute and relative positional information, and also other types of spatial-domain information such as velocity, acceleration, and the like, including measurement of motion in one or more directions. Various forms of positional information may also include time history components, as in the case of gesture recognition and the like. Accordingly, "position sensors" appropriately detect more than the mere presence or absence of an object and may encompass a broad range of equivalents.

Figure 1:
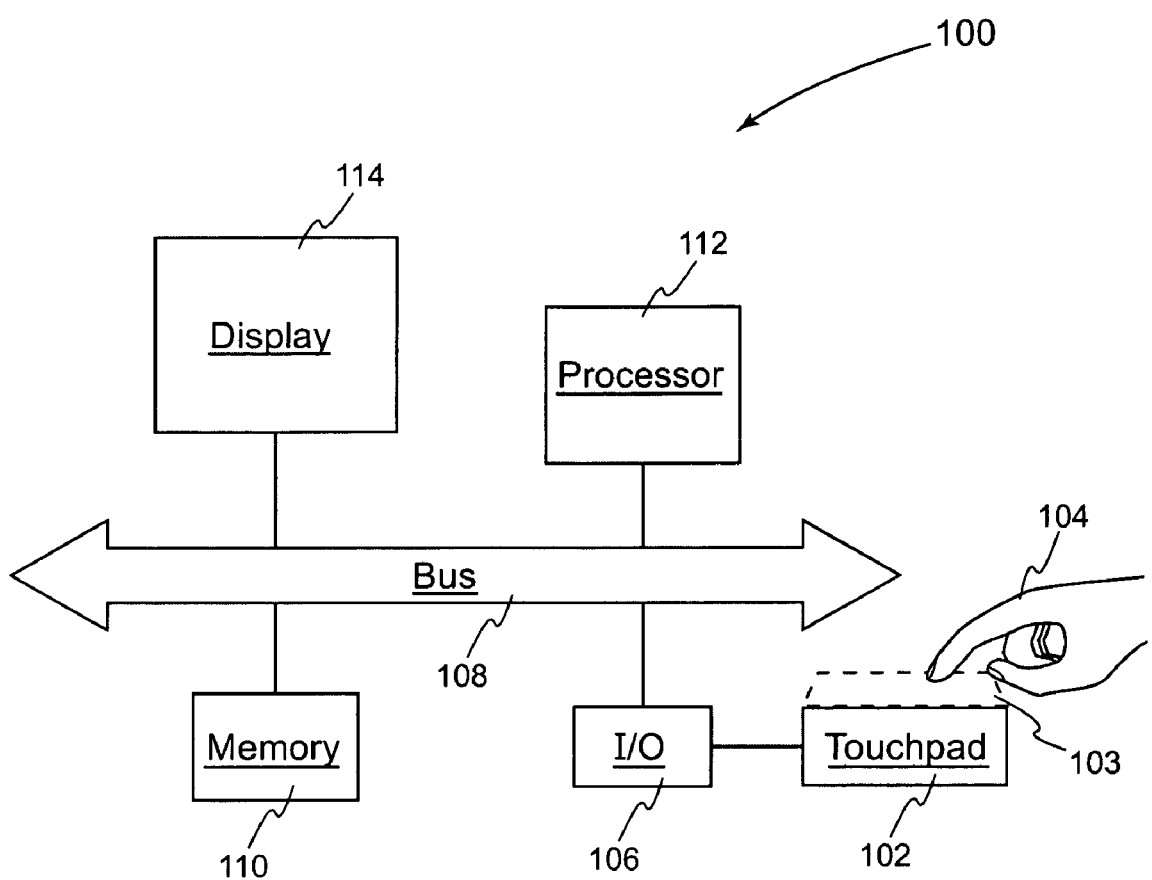
FIG. 1 is a block diagram of an exemplary computing system including a position sensor capable of producing a light effect.

Turning now to the drawing figures, FIG. 1 is a block diagram of an exemplary computing system 100 that includes a touchpad 102 or other position-sensing input device. Computing system 100 is any type of personal computer, portable computer, workstation, personal digital assistant, video game player, telephone, media player or other device capable of accepting input from a user and of processing information. Accordingly, the various embodiments of computing system 100 may include any type of controller or processor 112, memory 110, display 114, and input/output (I/O) interface 106 communicating via a bus 108, network or other interconnection. Touchpad 102 may be connected to system 100 via I/O interface 106 using any type of connection (e.g. a PS/2, Universal Serial Bus (USB) or other type of connection), or may be directly coupled to bus 108 as appropriate.

Touchpad 102 is sensitive to the position of a finger 104, stylus or other object within a sensing region 103. "Sensing region" 103 as used herein is intended to broadly encompass any space above, around, in and/or near touchpad 102 wherein the sensor of the touchpad is able to detect a position of the object. In a conventional embodiment, sensing region 103 extends from the surface of the sensor in one or more directions for a distance into space until signal-to-noise ratios prevent object detection. This distance may be on the order of centimeters or more, and may vary significantly with the type of position sensing technology used and the accuracy desired. Accordingly, the size and exact locations of the particular sensing regions 103 will vary widely from embodiment to embodiment.

In operation, touchpad 102 suitably detects a position of finger 104 or other object within sensing region 103, and provides electrical or electronic indicia of the position to interface 106. Interface 106 suitably forwards the position indicia to processor 112 via bus 108. Processor 112 appropriately processes the indicia to accept inputs from the user, to move a cursor or other object on display 114, or for any other purpose. In a further embodiment, touchpad 102 suitably includes a light source that is capable of creating a light effect that alters the appearance of touchpad 102 in response to instructions from processor 112 and/or interface 106, or as a function of user inputs detected within sensing region 103, as appropriate, and as described more fully below.

Figure 2A:
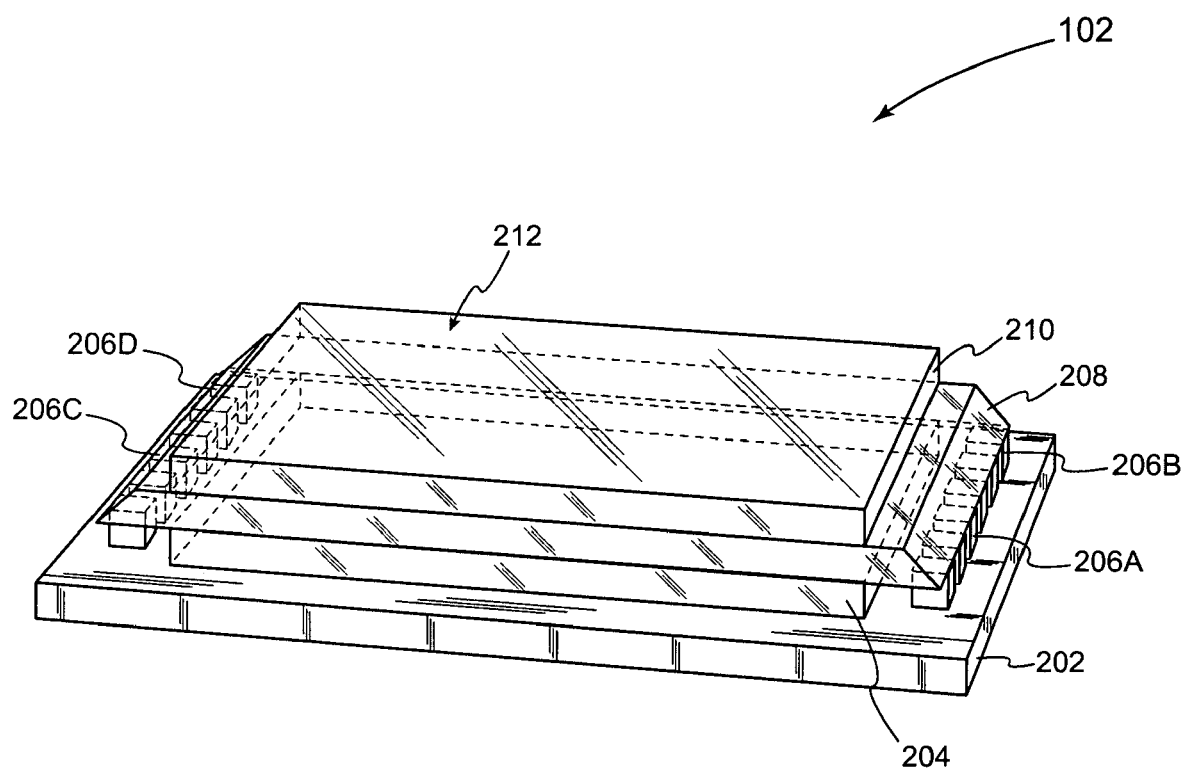
FIGS. 2A-B are perspective and side views, respectively, of an exemplary position sensor.
Figure 2B:
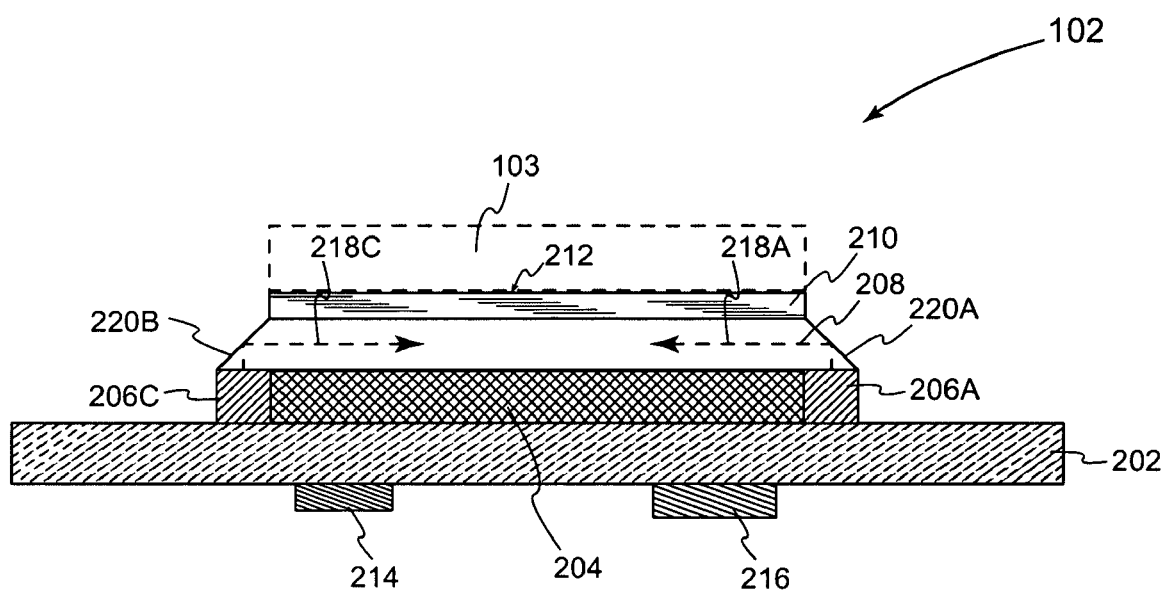

With reference now to FIGS. 2A and 2B, an exemplary touchpad 102 suitably includes a circuit board or other substrate 202 supporting a sensor 204. Touchpad 102 also includes a light source 206 that includes one or more light producers 206A-D, as well as a light conductor 208 for transmitting light across the outer face of sensor 204. The various components of touchpad 102 may be affixed together using any type of adhesive (e.g. epoxy, tape, pressure-sensitive adhesive and/or the like), or using any other joining technique.

Sensor 204 is any capacitive, resistive, inductive or other type of sensor that is capable of detecting the position of a finger, stylus or other object, as described above. Exemplary sensors 204 include the various sensors produced by Synaptics Inc. of San Jose, Calif., which appropriately detect a one dimensional, two dimensional or multi-dimensional position of an object using capacitive or inductive coupling.

As used herein, the term "light source" is intended to broadly encompass any device or combination of devices capable of providing light. In an exemplary embodiment, light source 206 is made up of one or more light producers 206A-D. Light producers 206A-D are any devices or components capable of providing any type of light, including any fluorescent, incandescent, coherent, stereoscopic, holographic or other source of light. Examples of various light producers 206A-D include light emitting diodes, light bulbs, vertical cavity surface emitting lasers (VCSELs), fiber light sources and/or the like. In one exemplary embodiment, light providers 206A-D are light emitting diodes such as those available from, for example, Agilent Technologies of Palo Alto, Calif. and other suppliers.

Light conductor 208 is any light transmission medium capable of conducting light emitted from one or more light producers 206A-D and/or of scattering light to make the light visible to the user. In various embodiments, light conductor 208 is a "light pipe" formed from plastic, glass or the like. Light pipes are available from, for example, Global Lighting Technologies of Brecksville, Ohio, as well as from Teledyne Lighting and Display Products of Los Angeles, Calif. and many others. Various light conductors and light conducting techniques are described, for example, in Application Brief I-003, "Light Guide Techniques Using LED Lamps" dated Dec. 7, 2001 and available from Agilent Technologies. In various embodiments, light conductor 208 is a custom light pipe that transmits light from light producers 206A-D across a surface of touchpad 102 as appropriate. Although conventional "ideal" light pipes merely transmit light with little or no scattering effect, some or all of light conductor 208 may be designed to be "leaky" in the sense that light is allowed to escape to produce a light effect and thereby alter the appearance of the position sensor using the techniques described above and below. Accordingly, various light conductors 208 may be designed such that portions of the conductor are "ideal" (or approximately ideal, scattering only very small amounts of light), and such that light is otherwise scattered from only a portion of the light conductor to produce the desired effect. In an exemplary embodiment of a touchpad 102, light conductor 208 may be implemented with a glass or plastic light pipe with a thickness on the order of about one millimeter and an area of about 37 mm×50 mm or so to cover the surface of a conventional sensor 204, although light conductors having widely varying dimensions could be constructed in alternate embodiments. Other embodiments of light conductor 208 may include one or more light pipes, one or more optical fibers, step index fibers, prisms, and/or other light transmission media, which may be used in place of or in conjunction with one or more light pipes.

In the exemplary embodiment shown in FIGS. 2A-2B, light conductor 208 is appropriately located between sensor 204 and the sensing region 103 of touchpad 102. Light conductor 208 may overlap either sensor 204 and/or sensing region 103 in whole or in part, and may not be perfectly situated between sensor 204 and sensing region 103 in all embodiments. Nevertheless, because light is brought in front of sensor 204 by light conductor 208, the need to make sensor 204 transparent/translucent is significantly reduced, since light is no longer required to pass through sensor 204 to reach the viewer's eye.

Light conductor 208 may also include one or more scattering elements (not shown in FIGS. 2A-B) for scattering, diffracting and/or dissipating light from light conductor 208, as described more fully below. Light transmitted within light conductor 208 may be scattered from the surface and/or from the bulk of the conductor by providing scattering elements such as protrusions, depressions, textures, materials, gaps, gratings, labels, etchings and/or the like on, in or next to conductor 208. Surface scattering, for example, may be implemented by etching, abrading, embossing, printing or otherwise forming a scattering pattern on a top, bottom, side and/or end face of conductor 208. Similarly, bulk-type scattering could be implemented by placing pockets of plastic, glass, fibers, paint, air or other materials within the volume of light conductor 208, by placing wavelength-sensitive gratings within conductor 208, or by any other technique. By selectively placing scattering elements in a pattern with respect to light conductor 208, light can be scattered from selected portions of conductor 208 to create various visual effects, including the "soft controls" and/or status indicators described below.

Touchpad 102 may also include an optional face sheet 210 to protect the various components of touchpad 102 from moisture, contaminants and the like, and to provide an appropriate touch surface 212 for touch inputs. Face sheet 210 is typically a mostly (but not perfectly) smooth surface to provide users with an appropriate glide feel. In an exemplary embodiment, face sheet 210 is implemented with plastic (e.g. polyester) or any other suitable material. If a face sheet 210 is used, the material should be transparent or translucent such that light from light conductor 208 is able to escape from touchpad 102 to become viewable to the user. In an alternate embodiment, face sheet 210 is omitted entirely and the outer surface of light conductor 208 is appropriately textured to provide a desired touch surface 212 for touch inputs. In a further embodiment, the outer surface of light conductor 208 may be rough or otherwise appropriately textured to simultaneously provide surface light scattering and a desirable touch surface 212 for touchpad 102.

In addition to supporting sensor 204, substrate 202 may also support a processor 214, memory 216 and/or other control circuitry, as best seen in FIG. 2B. The various circuitry components appropriately communicate with sensor 204 using digital or analog electrical signals provided through conventional vias or other electrical connections through or around substrate 202. The particular control circuitry used varies widely from embodiment to embodiment, but in exemplary embodiments processor 214 is a model T1004, T1005, T100X or other microcontroller produced by Synaptics Inc. of San Jose, Calif. Similarly, memory 216 may be implemented with any random access memory (RAM), read only memory (ROM), flash memory, magnetic or optical storage device, or any other digital storage medium. Alternatively, the logical functions of memory 216 may be incorporated into processor 214 such that a physically separate memory device 216 may not be present in all embodiments. In many embodiments, memory 216 suitably stores digital instructions in any software or firmware form that are executable by processor 214 to implement the sensing and control functions described herein.

In operation, sensor 204 is operable to sense user inputs correlating to the position of a finger or other object in proximity to touch surface 212. Sensing region 103 encompasses the volume in which touchpad 102 is able to distinguish the signal effect of the finger or other object from background noise. Objects are detected within sensing region 103 using conventional capacitive, inductive, resistive or other sensing techniques. Alternatively, objects may be detected using temperature, pressure, force, optical energy, acoustic energy or any other parameter. In an exemplary embodiment, object position is sensed in two dimensions (e.g. X and Y coordinates) using conventional capacitive sensing techniques. In such embodiments, digital positional indicia may be provided from processor 214 to computing system 100 (FIG. 1), as appropriate.

Light effects may be produced on touchpad 102 by any technique. In an exemplary embodiment, light producers 206A-D are activated to produce light 218A that propagates through light conductor 208 as appropriate. One or more of light producers 206A-D may be activated upon power up of touchpad 102, in response to control signals from processor 214 or any other source, or according to any other technique. In the embodiment shown in FIG. 2B, light producers 206A-D are spatially arranged to initially direct emitting light away from sensor 204, with reflective edges 220A-B of light conductor 208 reflecting light 218A-D toward the bulk of conductor 208. Light 218 is scattered from conductor 208 according to any surface and/or bulk scattering technique to thereby produce a visible light effect that alters the appearance of touchpad 102, as appropriate.

The various light effects that may be produced from touchpad 102 vary widely from embodiment to embodiment. By controlling the various light producers 206A-D from processor 214 (or computing system 100 or another controller) and/or by designing appropriate scattering elements in proximity to light conductor 208, numerous light effects may be implemented even on a single touchpad 102. Light producers 206A-D may be selectively activated or controlled, for example, to produce desired light effects in response to varying user inputs or status conditions of touchpad 102, and/or to reflect user preferences, on-screen events, processing modes for computing system 100, or the like. Other light effects that may be produced include uniform or non-uniform (e.g. with certain portions lighted more brightly than others) lighting of surface 212 or sensing region 103. Alternatively, one or more light producers 206A-D may be intermittently activated or varied in light intensity to produce a flashing, strobing or other temporal variation effect, or different light producers 206A-D may be selectively activated or controlled to produce light 218 of different colors, wavelengths and/or intensities. Various additional light effects are described more fully below.

Figure 3A:
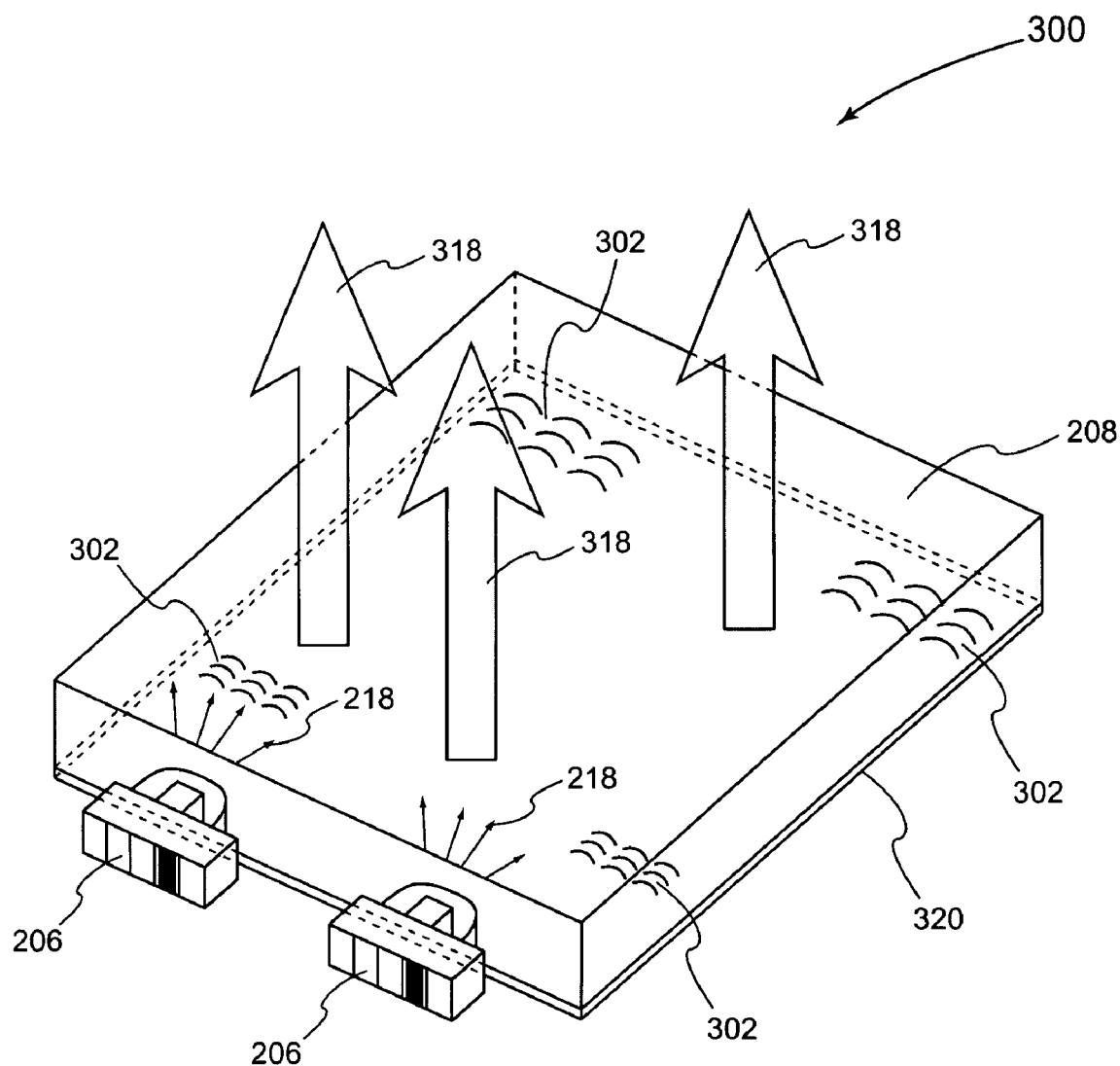
FIG. 3A is a perspective view of an exemplary light transmitting assembly suitable for use with a position sensor.

Light conductor 208 need not be integrally formed within touchpad 102. With reference now to FIG. 3A, an exemplary light conductor assembly 300 that may be integrally formed within a touchpad 102 or provided as a separate assembly suitably includes light sources having one or more light producers in optical communication with a light conductor 208. Light sources 206 shown in FIG. 3A each include a single right angle mount light emitting diode (LED), although other numbers, types and combinations of light producers could be used in alternate embodiments. Light sources 206 suitably produce light 218 that propagates through light conductor 208 and that is scattered by scattering elements 302. Assembly 300 may be provided as an add-on component, for example, to provide light effect functionality to existing touchpad sensors.

Figure 3B:
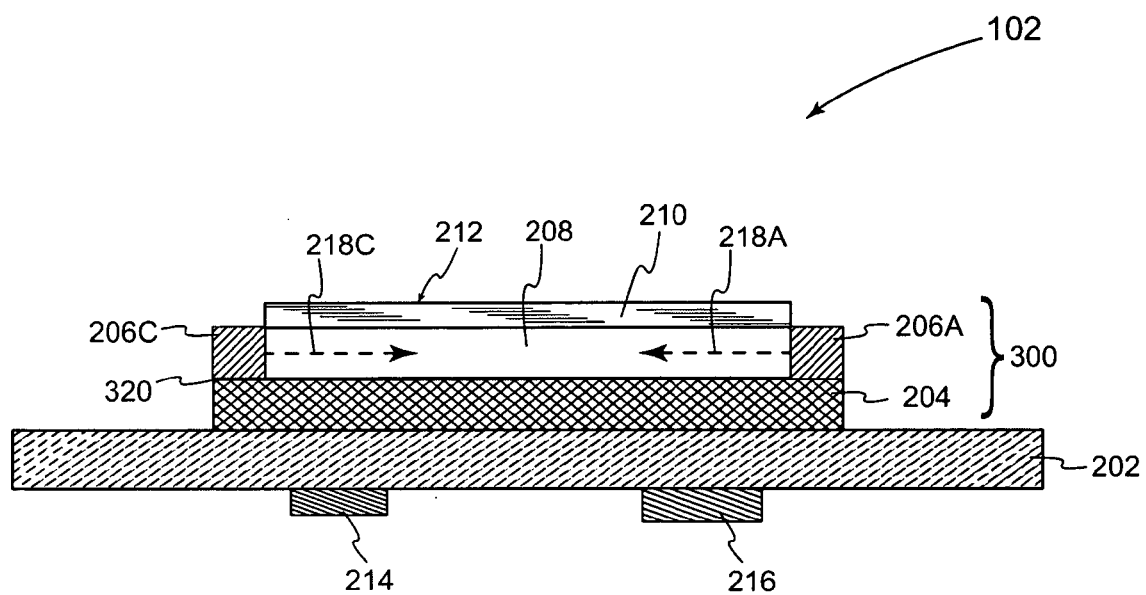
FIG. 3B is a side view of an exemplary position sensor including the light transmitting assembly of FIG. 3A.

In the embodiment shown in FIG. 3A, scattering elements 302 are indentations formed in a bottom surface of conductor 208, although additional or other scattering elements could be used in alternate embodiments. As shown in FIG. 3A, scattering elements 302 are shown to be smaller and/or less densely located near light sources 206, with larger and/or more densely situated scattering elements 302 located further away from light sources 206. Because this arrangement of scattering elements 302 provides the greatest amount of scattering in the portions of conductor 208 where the least amount of light is propagating, the result may be an approximately uniform scattering of light 318 emanating across surface 212 of touchpad 102. An optional reflection sheet 320 may also be provided to further enhance light scattering across light conductor 208, and a face sheet 210 (not shown in FIG. 3A) may also be provided to further enhance the functionality and desirability of assembly 300. FIG. 3B shows an exemplary touchpad 102 that includes light conductor assembly 300 providing light 218 from right-angled light sources 206 to light conductor 208, as appropriate. Again, assembly 300 may not be integrally formed within touchpad 102, but may be attached to sensor 204 using one or more adhesives, mechanical clamps, mechanical fasteners or other suitable attachment techniques.

Figure 3C:
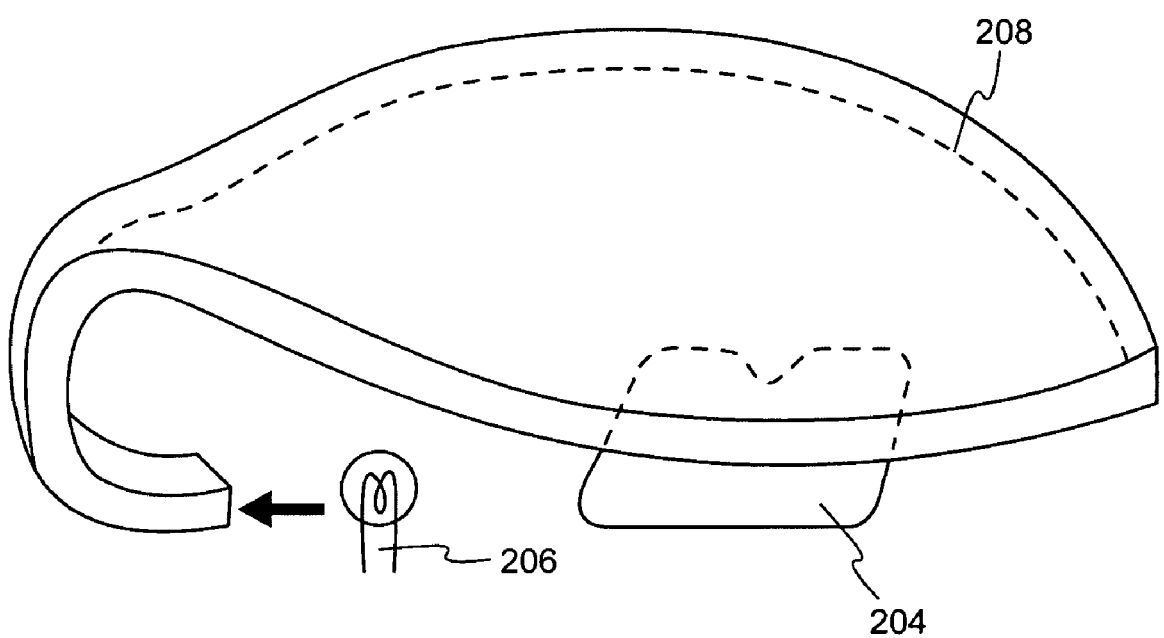
FIG. 3C is a perspective view of an alternate embodiment of an exemplary light conductor.

Further, and with reference now to FIG. 3C, light conductor 208 may be of any shape, and light source 206 may be located in any orientation or position relative to sensor 204. As shown in FIG. 3C, an alternate embodiment of light conductor 208 suitably conducts light from light source 206 to a desired location, surface or area in proximity to sensor 204. This design flexibility allows wide variability in the relative spatial positioning of light source 206 and sensor 204, as well as the other components of various position sensors. Light source 206 may be located, for example, underneath substrate 202, as a separate component from touchpad 102, or in any other suitable location in or near computing system 100. Accordingly, light source 206 need not be integrally formed with touchpad 102.

Figure 4:
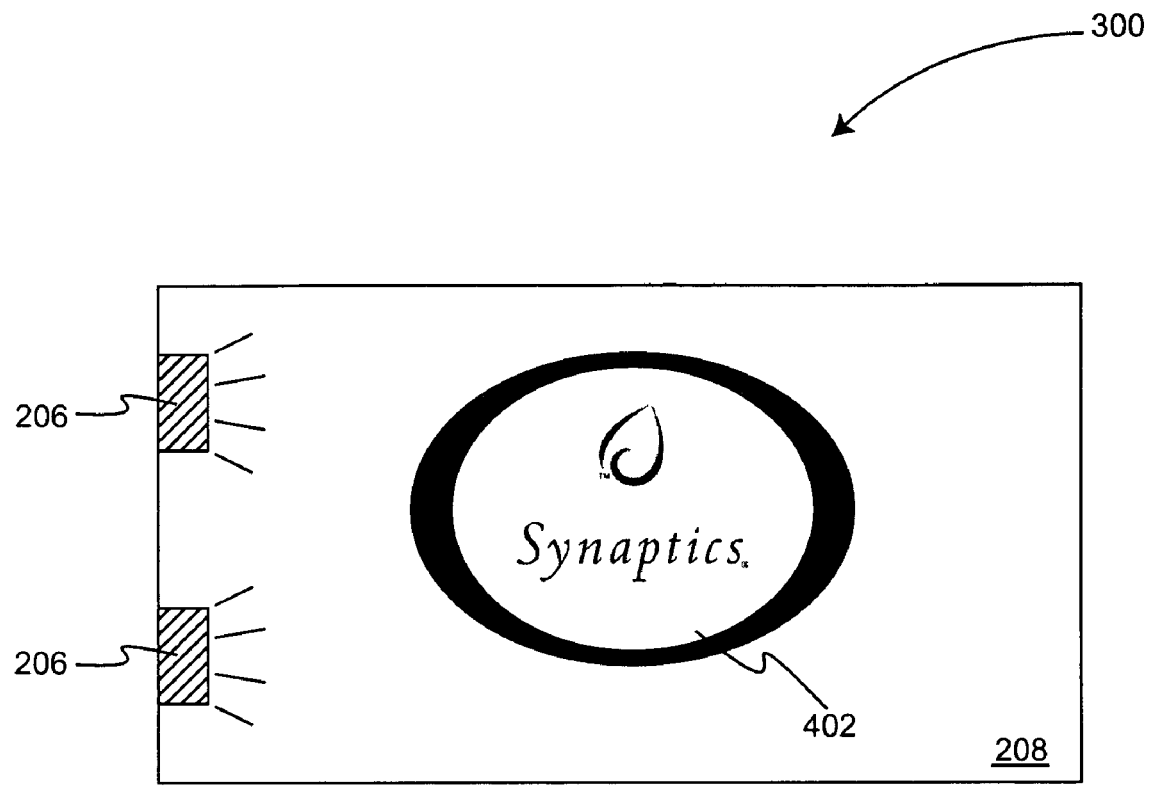
FIG. 4 is a top view of an exemplary light transmitting assembly capable of displaying a logo or other design.

With reference now to FIG. 4, an alternate embodiment of a light conductor assembly 300 suitably includes a logo, status indicator, ornamental design or other pattern 402 in place of or in addition to scattering elements 302 (FIG. 3A). Pattern 402 may be etched, beveled, embossed or otherwise formed in or on any surface of light conductor 208, or may be formed with a label, decal or the like on or near any surface of light conductor 208. Alternatively, pattern 402 may be formed with in the volume of light conductor 208 using air gaps, particulates, bubbles and/or diffraction gratings present in light conductor 208, or by any other technique. As light 218 is produced by one or more light producers (not shown) of light source 206, pattern 402 suitably scatters light such that the logo or other pattern becomes visible to the user. The pattern may be seen, for example, on touch surface 212 (FIG. 2A), or elsewhere within sensing region 103 (FIG. 1) using stereoscopic, holographic or other lighting techniques.

In an exemplary embodiment, pattern 402 is formed with diffraction gratings that are sensitive to a wavelength, polarization or other component of light 218. Alternatively, pattern 402 may be formed in or on light conductor 208 with light-sensitive paint or the like. Examples of light-sensitive paint include phosphorescent paint, fluorescent paint, wavelength-sensitive paint and the like. When the gratings and/or paint are exposed to light 218 having the appropriate properties, at least a portion of the light is scattered, absorbed and/or emitted by the grating and/or paint so that the pattern becomes visible to the user. Further, multiple patterns 402 may be present within various embodiments, with different light producers (not shown) of light source 206 being activated to produce light of differing wavelengths and/or polarizations to illuminate the various patterns at desired times. In this manner multiple patterns 402 may be produced by varying and/or modulating the intensity, frequency, direction, location and/or polarization of light produced by any particular light source 206, or by selectively activating different light sources to produce the desired light effects. Different patterns 402 may include logos, ornamental designs, status indicators and/or "soft controls" that demark particular portions of sensing region 103 for special purposes. These soft controls may include buttons, sliders, character input regions, and the like.

Figure 5:
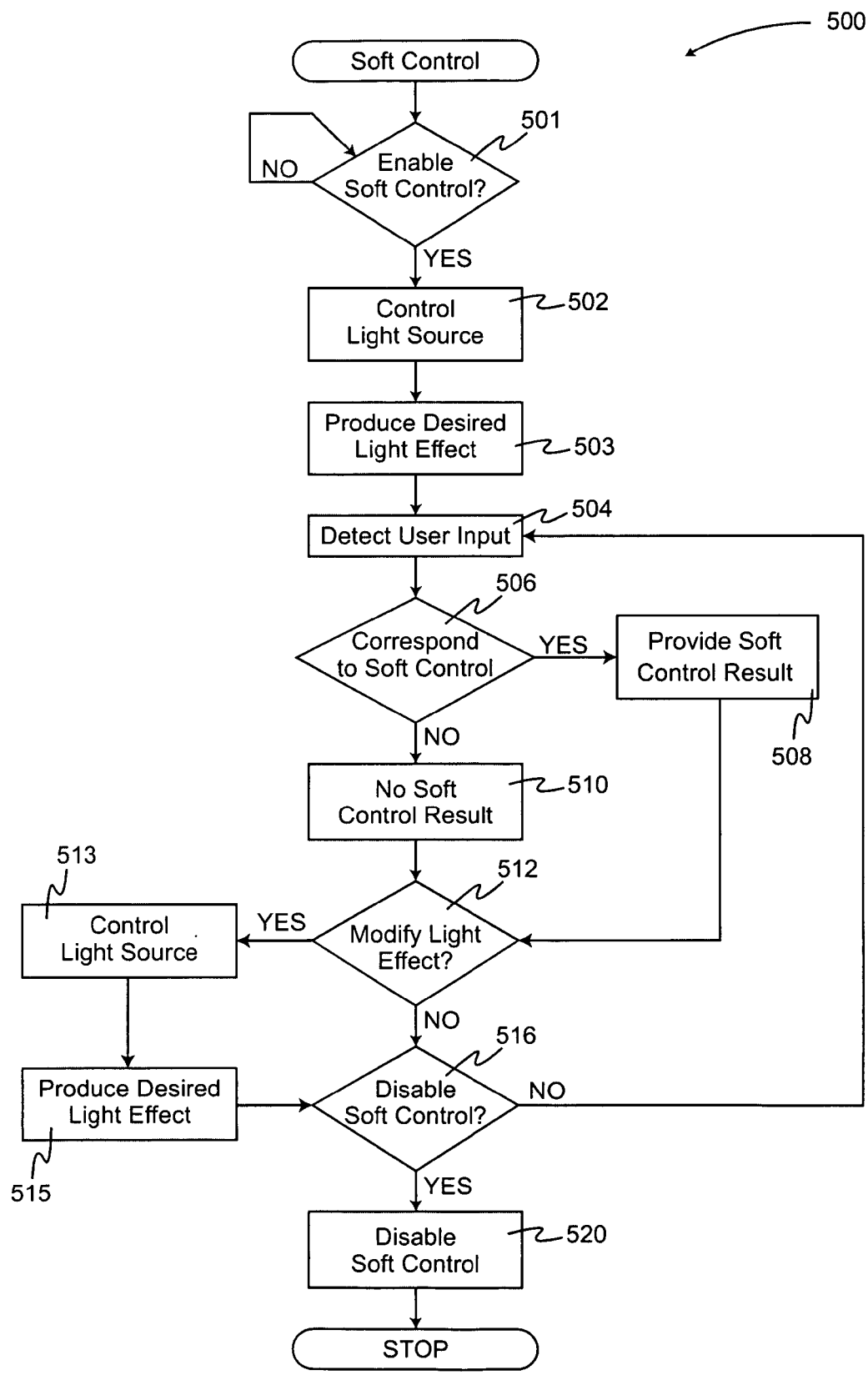
FIG. 5 is a flowchart of an exemplary process for controlling a position sensor.

FIG. 5 is a flowchart of an exemplary process 500 for controlling and operating a position sensor that includes soft control functionality. While many of the functions described in FIG. 5 may be computer-implemented using software or firmware instructions, FIG. 5 is intended to illustrate various exemplary functions in logical form, and is not intended to present a literal implementation of a software routine. Accordingly, the various modules, functions and routines shown in FIG. 5 may be enhanced, eliminated and/or differently organized in the many alternate practical embodiments. The various steps and modules set forth in process 500 may be implemented using any computer language, modules, applications, instructions or the like, and may be stored permanently or temporarily in memory 216 or in any other digital storage medium including a floppy disk, CD-ROM, RAM, ROM, optical or magnetic mass storage device, or the like. The instructions used to implement various portions of process 500 may also be transmitted as modulated signals on carrier waves transmitted across any communications medium such as a digital network, wireless link, or the like.

With reference now to FIG. 5, an exemplary process 500 for controlling a touchpad 102 (FIG. 1A) or other position sensor suitably includes the broad steps of controlling a light source (step 502) to produce an appropriate light effect (step 503), sensing user input corresponding to the position of an object (step 504), processing any soft control functionality (steps 506, 508, 510), modifying the light effect produced (steps 512, 513, 515), and/or disabling the soft control (step 516, 520) as appropriate.

Enabling the soft control (step 501) suitably initiates a process 500 that begins by activating and/or controlling light source 206 as appropriate (step 502). One or more LEDs or other light producers 206A-D (FIGS. 2A-B) may be activated or deactivated, for example, or otherwise controlled to produce a desired light effect (step 503). As described above, light producers 206A-D may be activated via a control signal provided by processor 214 (FIG. 2B), via computing system 100 through I/O interface 106 (FIG. 1), or by any other technique. Each of the light producers 206A-D present in a particularly embodiment may be activated in response to any stimulus, including a user selection of an operating mode for touchpad 102, an event occurring within an application executing on computer system 100 (FIG. 1), a particular input received by sensor 204 (FIGS. 2A-B, 3B), or the like.

Step 502 may also include providing light or light components with a desired wavelength, polarization and/or intensity to produce a desired light effect on touchpad 102 (step 503). Various forms of gratings, paint and/or scattering elements are sensitive to particular wavelength components, polarization components and/or locations of the light produced, such that certain patterns appear near light conductor 208 only when light of the appropriate parameters is produced. Light components may be varied in any manner, including by controlling a variable-input light source to modulate the intensity, frequency, color or another component of light produced, or by activating and/or deactivating one or more light producers in different positions or capable of providing light having the appropriate parameters to produce the desired light effects. To activate a soft control, for example, tuned diffraction gratings and/or light-sensitive paint may be used to create a pattern 402 defining the control. When light of the particular characteristics is produced, the soft control becomes visible in sensing region 103.

Detecting a user input (step 504) suitably involves obtaining position-related information about the object at sensor 204. The position may be sensed and processed using, for example, conventional position sensing techniques such as those set forth in U.S. Pat. No. 5,880,411, referenced above. In a capacitive position sensor, for example, capacitive coupling between sensor 204 and the object in the sensing region remains possible even when light conductor 208 is disposed between sensor 204 and the object 104 being sensed. In other embodiments, position-related information may be obtained using inductive techniques, resistive techniques or the like. Positional information may be obtained in one or more directions using any conventional technique presently known or subsequently developed.

In an exemplary embodiment, touchpad 102 returns a unique result to computing system 100 if the user's input corresponds to an enabled soft control (step 506). Activating a soft button, for example, may result in a particular response from touchpad 102 and/or computing system 100. Soft controls may include buttons, sliders, character or gesture recognition regions, biometric observation regions, or the like. In an exemplary embodiment, a soft button is provided on a portion of a touchpad 102 to perform a task (e.g. open an application) on system 100. If the user's finger (or other object sensed) is identified in the soft control portion of sensing region 103, then an appropriate result may be provided (step 508) to computing system 100 to indicate that the "button" has been activated. Conversely, the portions of touchpad 102 outside of the soft control may retain conventional pointing functionality, so inputs outside of the soft control pattern 402 appropriately result in no soft control results (e.g. conventional positional outputs) being provided to computing system 100 (step 510).

In various embodiments, the sensed position of the object may be used to modify the light effect produced (steps 512, 513, 515). If the light effect is to be modified (step 512), light source 206 is appropriately controlled (step 513) to produce the desired effect (step 515), as described above. Touching or tapping a soft control button, for example, may activate a light effect that reveals another set of soft controls. Alternatively, the light effect could simply be flashed, the color of the light could be changed, or any other light effect could be produced (step 515). In one embodiment, touchpad 102 may be used to estimate the pressure of a touch on touch surface 212. Pressure is sensed, for example, by tracking changes in the surface area of touch surface 212 that is in contact with a user's finger, since greater pressure typically results in increased deformation of the user's finger, and therefore a greater surface area touched. This information could be used to vary the color of the light effect, for example, or to produce a light effect only on the portion of touch surface 212 that is in contact with the user's finger. Further, the position, brightness, color or other aspect of the effect could be adjusted as a function of and/or in response to the sensed position of the object. As such, a wide array of light effects could be produced in various alternate embodiments. Moreover, light effects could be modified (step 514) in response to stimuli other than user input. Data received from computing system 100 or any other external source, for example, could be used to place touchpad 102 into a desired input mode with a corresponding light effect, visible pattern 402 and/or set of soft controls. Some or all light producers of light sources 206 may be further deactivated (steps 516, 520) in response to positional information or external factors (e.g. system status, etc) as appropriate. Feedback to the user could also be provided from display 114 (FIG. 1), an audio speaker associated with touchpad 102 or computing system 100 (FIG. 1), and/or any other source. In an embodiment that provides soft control buttons corresponding to the buttons of a calculator, for example, an audible sound from computing system 100 could be produced to indicate that the user had activated a soft button. Many other types of feedback may be produced, and will vary widely from embodiment to embodiment.

Soft controls may be disabled using any technique (steps 516, 520). In an exemplary embodiment, a user taps a soft button or otherwise activates a soft control. In another exemplary embodiment, computing system 100 instructs touchpad 102 to disable the soft control.

Figure 6A:
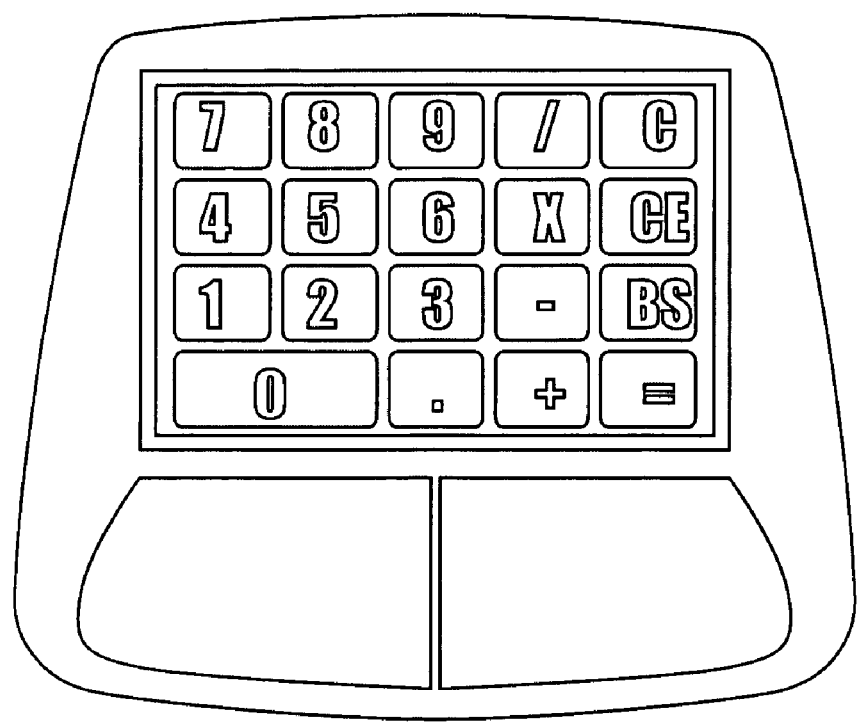
FIGS. 6A-B are perspective views of exemplary soft control implementations of a calculator and media player, respectively.
Figure 6B:
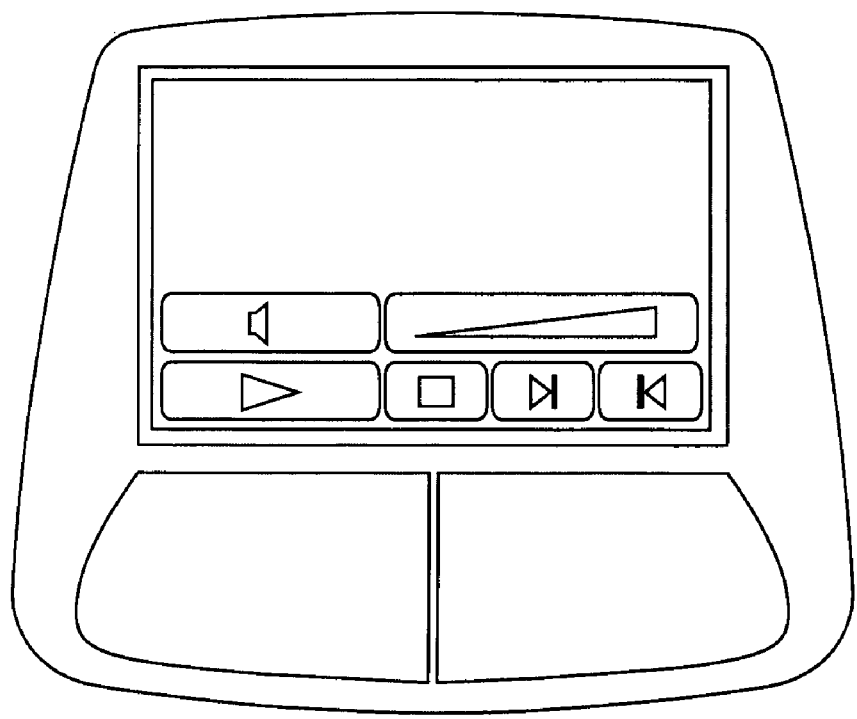

Exemplary implementations of touchpads 102 having soft controls are shown in FIGS. 6A and 6B, respectively. FIG. 6A shows an exemplary calculator implementation with various soft buttons corresponding to the various calculator functions. FIG. 6B shows an exemplary media player implementation whereby soft controls are used to play, pause, forward or reverse the media being played, as appropriate, and/or to implement a volume slider and/or other controls. As shown in FIGS. 6A-B, multiple soft controls may be placed on a single touchpad 102, and indeed multiple sets of soft controls may be activated at different times using the grating and/or wavelength/polarization sensitivity techniques described above, by activating different light providers 206A-D, or by any other technique. As mentioned above, light effects produced on a touchpad 102 are not limited to soft controls, but may alternatively include variations in light color or intensity, status indicators, ornamental designs, logos and the like.

Accordingly, there are provided numerous systems, devices and processes for producing light effects that alter the appearances of touchpads and other position sensors. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiments. It should be understood that various changes can be made in the function and arrangement of elements without departing from the scope of the invention as set forth in the appended claims and the legal equivalents thereof.

The invention claimed is:

1. A position sensor for detecting a position of an object in a single sensing region, comprising:
   an opaque capacitive proximity sensor configured to sense the position of the object in the single sensing region based on a conductive property of the object;
   a light source for producing light;
   a light conductor coupled to the light source and at least partially disposed over the opaque sensor, the light conductor comprising a plurality of scattering elements configured to transmit the light; and
   a controller coupled to the plurality of light sources and configured to selectively activate the light source to generate at least two different actively driven light effects in the single sensing region.

2. The position sensor of claim 1, wherein the light source is configured to vary a color of the light.

3. The position sensor of claim 2, wherein the light source comprises a plurality of light producers, each light producer configured to produce a different color light.

4. The position sensor of claim 1, wherein the light source is configured to vary an intensity of the light.

5. The position sensor of claim 1, further comprising a controller coupled to the light source and configured to cause different light effects at different times.

6. The position sensor of claim 5, wherein the controller is further configured to determine a position of the object in a single dimension.

7. The position sensor of claim 5, wherein the controller is further configured to determine a position of the object in a plurality of dimensions.

8. The position sensor of claim 1, wherein the light conductor is non-uniformly textured to scatter the light.

9. A system for responding to a position of an object in a single sensing region, comprising:
   a position sensor, comprising:
      an opaque capacitive proximity sensor configured to sense the position of the object in the single sensing region based on a conductive property of the object,
      a light source configured to produce light, and
      a light conductor coupled to the light source and at least partially disposed over the opaque sensor, the light conductor configured to transmit at least a portion of the light from the light source to generate driven light effects in the single sensing region;
   a processor coupled to the light source and configured to control production of the light, wherein the processor is configured to selectively activate the light source to generate at least two different actively driven light effects in the single sensing region; and
   a display coupled to the position sensor and the processor, the display configured to illustrate a digital representation based on the position.

10. The system of claim 9, wherein the light source is configured to produce different colors of light.

11. The system of claim 9, wherein the light source is configured to produce different intensities of light.

12. The system of claim 9, wherein a first driven light effect indicates a first status of the system and a second driven light effect indicates a second status of the system.

13. The system of claim 9, wherein a first driven light effect indicates a first mode of the system configured to respond to input in the single sensing region and a second driven light effect indicates a second mode of the system configured not to respond to input in the single sensing region.

14. A method for detecting a position of an object in a single sensing region, the method comprising the steps of:
   sensing, via an opaque capacitive proximity sensor, the position of the object in the single sensing region based on a conductive property of the object;
   controlling, via a control system, light produced by a light source; and
   generating, via a light conductor coupled to the light source, driven light effects in the single sensing region using at least a portion of the light,
   wherein the control system is configured to selectively control the light produced by the light source to generate at least two different actively driven light effects in the single sensing region.

15. The method of claim 14, wherein the controlling step comprises the step of varying a color of the light to generate the driven light effects.

16. The method of claim 15, wherein the varying step comprises the steps of:
   varying, via the control system, light from a first light producer within the light source to generate a first light effect including a first color in the single sensing region; and
   varying, via the control system, light from a second light producer within the light source to generate a second light effect including a second color in the single sensing region.

17. The method of claim 15, wherein the varying step comprises the steps of:
   varying, via the control system, light from a light producer within the light source to generate a first light effect including a first color in the single sensing region; and
   varying, via the control system, light from the light producer to generate a second light effect including a second color in the single sensing region.

18. The method of claim 14, wherein the controlling step comprises the step of varying an intensity of the light to generate the driven light effects.

19. The method of claim 18, wherein the varying step comprises the steps of:
   varying, via the control system, light from a first light producer to generate a first light effect including a first intensity in the single sensing region; and
   varying, via the control system, light from a second light producer to generate a second light effect including a second intensity in the single sensing region.

20. The method of claim 18, wherein the varying step comprises the steps of:
   varying, via the control system, light from a light producer to generate a first light effect including a first intensity in the single sensing region; and
   varying, via the control system, light from the light producer to generate a second light effect including a second intensity in the single sensing region.

* * * * *